United States Patent
Chappell et al.

(10) Patent No.: US 8,086,782 B2
(45) Date of Patent: *Dec. 27, 2011

(54) TAPE IMAGE ON NON-TAPE STORAGE DEVICE

(75) Inventors: Simon Chappell, Dorset (GB); Fabrice Helliker, Broadstone (GB)

(73) Assignee: Quest Software, Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/844,297

(22) Filed: Jul. 27, 2010

(65) Prior Publication Data

US 2011/0179223 A1    Jul. 21, 2011

Related U.S. Application Data

(63) Continuation of application No. 11/076,540, filed on Mar. 9, 2005, now Pat. No. 7,814,260.

(51) Int. Cl.
*G06F 12/00* (2006.01)
(52) U.S. Cl. .................... 711/4; 711/E12.002
(58) Field of Classification Search ............. 711/4, 100, 711/111, 112, 161, 162, 165, 114
See application file for complete search history.

(56) References Cited

U.S. PATENT DOCUMENTS

| | | | |
|---|---|---|---|
| 4,428,064 A | 1/1984 | Hempy et al. | |
| 5,263,154 A | 11/1993 | Eastridge et al. | |
| 5,819,020 A | 10/1998 | Beeler, Jr. | |
| 5,819,296 A | 10/1998 | Anderson et al. | |
| 5,974,563 A | 10/1999 | Beeler, Jr. | |
| 6,018,744 A | 1/2000 | Mamiya et al. | |
| 6,260,006 B1 | 7/2001 | Wong et al. | |
| 2002/0035664 A1 | 3/2002 | Yates et al. | |
| 2003/0149830 A1 | 8/2003 | Torr et al. | |
| 2005/0166010 A1 | 7/2005 | Martin | |
| 2005/0172093 A1 | 8/2005 | Jain | |
| 2006/0010286 A1 | 1/2006 | Topham et al. | |
| 2006/0123208 A1 | 6/2006 | Johnson | |
| 2008/0133827 A1 | 6/2008 | Topham et al. | |

FOREIGN PATENT DOCUMENTS

GB          2063532 A    6/1981

OTHER PUBLICATIONS

Dianne McAdams; "Disk-to-Disk Backup—It's Also About Tape"; Research Perspectives, Data Mobility Group; Nashua, NH; Jun. 28, 2004 (6 pgs.).

*Primary Examiner* — Pierre-Michel Bataille
(74) *Attorney, Agent, or Firm* — Knobbe Martens Olson & Bear, LLP

(57) ABSTRACT

A method and system for facilitating the performance of data backups facilitates the storage of information being backed up on a non-tape storage device in a format that facilitates the subsequent transfer of the information to a tape storage device without substantial further processing by a computer.

11 Claims, 4 Drawing Sheets

TAPE IMAGE ON NON-TAPE STORAGE DEVICE

CROSS-REFERENCE TO RELATED APPLICATIONS

This patent application is a continuation of U.S. patent application Ser. No. 11/076,540, filed on Mar. 9, 2005, now U.S. Pat. No. 7,814,260. U.S. patent application Ser. No. 11/076,540 (U.S. Pat. No. 7,814,260) is incorporated herein by reference.

TECHNICAL FIELD

The present invention relates generally to methods and devices for backing up computer files. The present invention relates more particularly to the copying of files being backed up to a non-tape storage device where they are stored according to a tape format.

BACKGROUND

Backup procedures for computers are well known. Backup procedures are performed in order to provide a copy of the data stored on a computer or an associated storage device, so that the data can later be restored in the event that the original data is accidentally or maliciously lost.

As those skilled in the art will appreciate, data can be accidentally lost through computer hard disk failures, power losses, fires, floods, earthquakes, and a variety of other unfortunate events. Data can be maliciously lost through erasure, viruses, tampering, and other such intentional events. There is simply no way known at the present to prevent such accidental and malicious loss of data.

However, actual harm caused by the loss of data can be mitigated with comparatively little cost and inconvenience by implementing backup procedures to prepare for this eventuality. The use of backup procedures is general far less expensive and inconvenient than the consequences of irretrievably losing the data. One of the consequences of irretrievably losing data may be the need to reconstruct the data. Reconstruction of the data is likely to be an undesirably costly and time consuming process.

Frequently, the data simply cannot be reconstructed. The original sources of the data may no longer exist or may be untraceable. Important information is often permanently lost with severe financial consequences.

Backing up data is merely the process of making an extra copy of the data, so that if the original data is lost or corrupted, the extra copy may be used in its place. This redundancy decreases the likelihood that a single incident or malicious event can make the data permanently unavailable.

Typically, the backed up data is copied to another storage device. This backup storage device typically has removable media, so that the backed up data can then be easily moved to a remote location for safe keeping. Thus, even in the event of a catastrophe, such as a fire or earthquake, at the location of the original data, the backed up data is not likely to be affected.

Various different systems for performing backups are known. Backups can be made to network attached storage (NAS) devices, storage area networks (SANs) and a variety of other storage devices including tape drives.

A NAS device is a storage device that is dedicated solely to file sharing. NAS devices typically communicate using TCP/IP over an Ethernet connection. Although multiple storage devices can be used, NAS systems frequently use a single storage device. A NAS device can add storage capacity to a server without disruption of the system. That is, since a NAS device is not an integral part of a server, there is no need to shut down the system for maintenance or upgrades when adding a NAS device. A NAS device can be located anywhere that is desired within a LAN.

A SAN is a network of shared data storage devices that communicate using Fibre Channel over a SCSI interface. Thus, a SAN has several separate storage devices. A SAN provides simplified storage management, more efficient access to stored data, scalability, and easier backup.

An advantage of backing up to a NAS device, a SAN, or some other disk based storage system rather than backing up to a tape drive is the speed of the process. Since backups can be performed much more rapidly to disk based storage system, there is less disruption to the server, as well as to the network in general, than when a backup is being made to a tape drive. Thus, it is possible to perform a backup during the day when the server is busy.

However, backups are typically transferred to tape after they are initially performed to a disk based storage system. This is desirable in order to free up storage capacity on the disk based storage system and to facilitate removal of the media to a remote location for safe keeping.

Transfer of the backed up data to tape necessitates that the data be formatted for the particular tape drive being used. Disk based storage systems, such as NAS devices, may lack the ability to format the data in this manner. Therefore a computer, such as a server, must therefore be used to effect this process. Of course, the server's resources are generally better spent performing the server's normal duties, such as serving files.

Even if the disk based storage system is capable of formatting the data for storage on the tape drive, it is not desirable to have the disk based storage system do so. Having the disk based storage system format the data undesirably reduces the availability of that system for routine data storage tasks.

Thus, although such contemporary disk based backup methods and systems have proven generally suitable for their intended purposes, they possess inherent deficiencies which detract from their overall effectiveness and desirability. The resources of a server or storage device are undesirably tied up during the process of transferring previously backed up data to from a disk based storage device to a tape drive. This inefficient use of such resources reduces the advantages of storing the data to the disk based storage system in the first place.

As such, although the prior art has recognized, to a limited extent, the problem of maximizing the availability of server and storage resources during backup processes, the proposed solutions have, to date, been ineffective in providing a satisfactory remedy. Therefore, it is desirable to provide a method and system for backing up data to a disk based storage system, such as a NAS device or a SAN, and subsequently to a tape drive, wherein the undesirable use of system resources is mitigated.

BRIEF SUMMARY

According to one aspect of the present invention, backed up information is stored on a non-tape storage device in a format that facilitates the subsequent transfer of the information to a tape storage device without requiring substantial further processing by a computer. Thus, the undesirable use of network resources to effect the transfer of the backed up information from the non-tape storage device to the tape storage device is mitigated.

In one embodiment, backed up information is stored in a tape format on a disk based storage device, such that of a NAS device or a SAN. The information may be stored as a tape image, such as according to ANSI/ISO/ECMA DDS, DDS-DC and/or DDS-2.

The information is subsequently transferred to a tape storage device. Since the information was stored in a manner that reduces the need for a computer to effect the transfer, the undesirable use of network resources during the transfer is mitigated. The information may be transferred from the disk based storage device to the tape storage device without the used of a computer to change the data structure, format, or protocol of the information. The information thus does not need to pass through a computer as it is transferred from the disk based storage device to the tape storage device.

Network resources that are used less according to the present invention include server capacity and network bandwidth. Mitigating the amount of network resources required for the transfer of information from the disk based storage device to the tape storage device desirably frees these resources, so that they are available to perform the normal, e.g., non-backup, duties of the network.

This invention will be more fully understood in conjunction with the following detailed description taken together with the following drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION OF THE PREFERRED EMBODIMENTS

Figure 1:
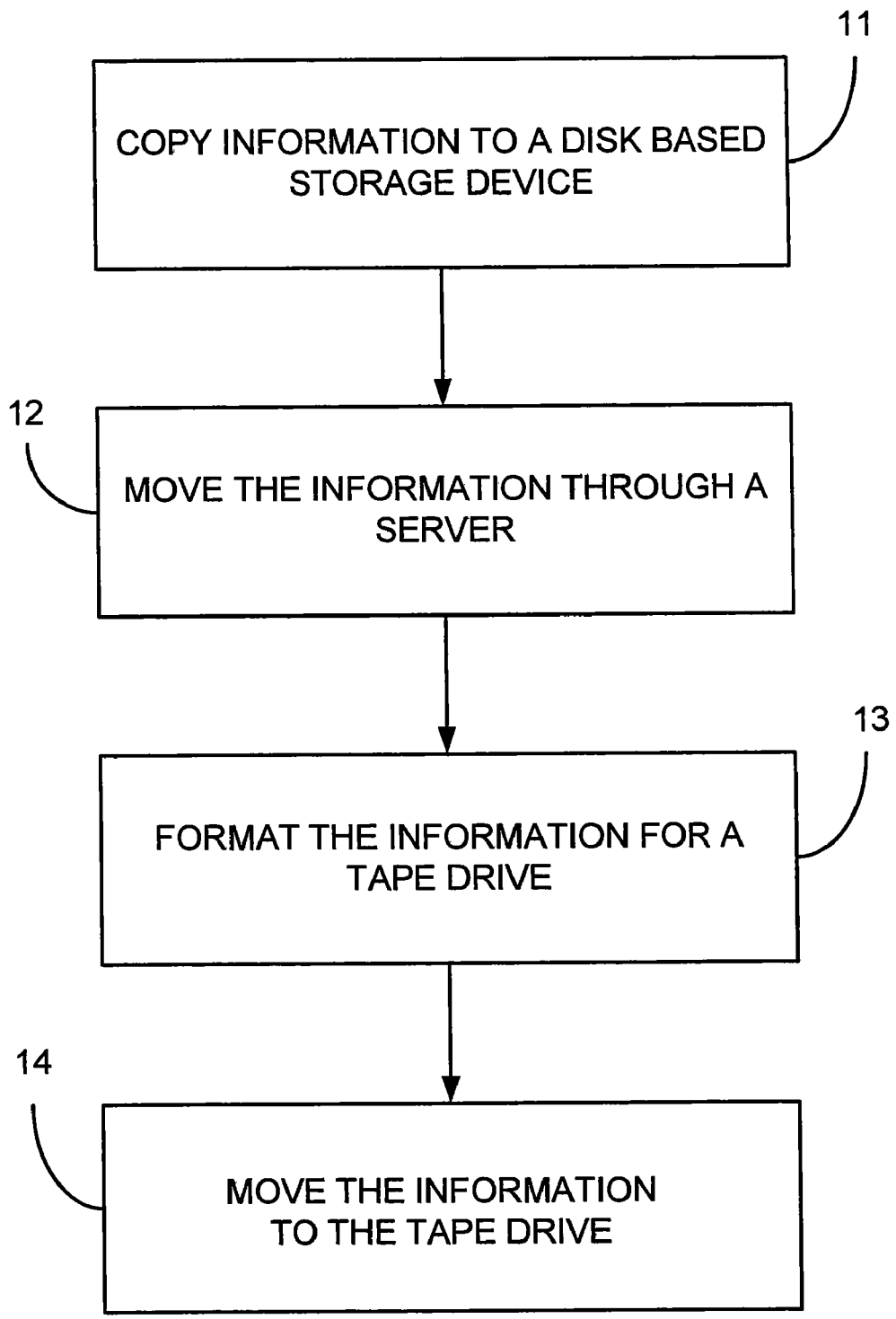
FIG. 1 is a flow chart showing the contemporary process for backing up information to a disk based storage device and subsequently transferring the information to a tape drive, wherein the information is transferred back through the server so as to facilitate formatting of the information for the tape drive.

Referring now to FIG. 1, according to contemporary methodology, a backup may be performed by first copying information to a disk based storage system as shown in block 11. The disk based storage system may be a network storage device, such as a NAS device or a SAN. This copying of the information to a disk based storage device is done before the information is transferred to tape. It is often desirable to back up information from a server or network storage device by copying the information to a disk based storage device because of the speed involved in such a procedure.

Since data transfers between two disk based devices (such as the hard drive of a server and the hard drive of a NAS) occur much faster than data transfers between a disk based device (such as the hard drive of a server) and a tape drive (such as that upon which it is desired that backed up data ultimately be stored), server resources are conserved when the server is backed up to a disk based storage device. Because such disk-to-disk backups are performed efficiently, it is possible to perform such backups when the server is busy, such as during the day. This is particularly important in today's global economy, when many servers do no have a non-busy time.

However, it is generally desirable to ultimately store the backed up information on tape. Tape is a removable media that can easily be transported to a remote location for safe keeping. Tape is comparatively inexpensive. Tape is comparatively durable and is generally preferred for long term storage. Also, transferring the backed up information to tape allows at least a portion of the disk based storage device to be used for other purposes.

Thus, first storing backed up information on a disk based storage device and subsequently transferring the backed up information to tape reduces undesirable interruptions to the network caused by the backup process and provides the long term storage advantages associated with tape.

However, according to contemporary methodology, it is necessary to move the backed up information through a computer, such as a server, as it is transferred to a tape drive, as shown in block 12. This is because the information was stored in the normal format for storing information on a disk based storage device. That is, the information was not stored in a manner that better facilitates the subsequent transfer of the information to a tape storage device without additional processing by a computer. More particularly, the information was not stored in a tape format, such as a tape image.

As used herein a tape format is any format that reduces the processing or formatting of the information that is required in order to transfer the information from a non-tape storage device to a tape storage device. One example of a tape format is a tape image, such as a tape image according to ANSI/ISO/ECMA DDS, DDS-DC and/or DDS-2.

A tape image is an image of the information as it is stored on the tape, where no substantial processing by a computer is needed to store the information on tape and the information thus merely needs to be communicated to the tape storage device. That is, a tape image is already processed, formatted, or otherwise manipulated to the point where the data is suitable for direct storage by a tape storage device, such as a tape drive. Thus, a tape image is one or more files that are ready to be stored on tape without substantial further processing.

Generally, each different type of tape drive requires a unique tape image for a given data set. That is, the information must be formatted in a manner that is appropriate for the particular type of tape drive being used.

Thus, according to contemporary methodology, after the backed up information has been stored on a disk storage device as shown in block 11, and before the information can be transferred to tape, the information must pass through a computer, such as a server, as shown in block 12. Moving the information through a server allows the server to format the information for the particular type of tape drive being used.

The information is formatted by the server for the tape drive being used, as shown in block 13. Of course, this formatting process uses substantial server and network resources. Substantial server central processing unit (CPU) time is required for the formatting process. Indeed, the server may not be available for other tasks when backed up information is being transferred from a disk based storage system to tape. Also, substantial network bandwidth may be required to transfer the information from the disk based storage device to the server and from the server to the tape backup device.

After the data has been formatted so that it is suitable for storage by the tape drive, the data is moved from the server to the tape drive as shown in block 14.

Figure 2:
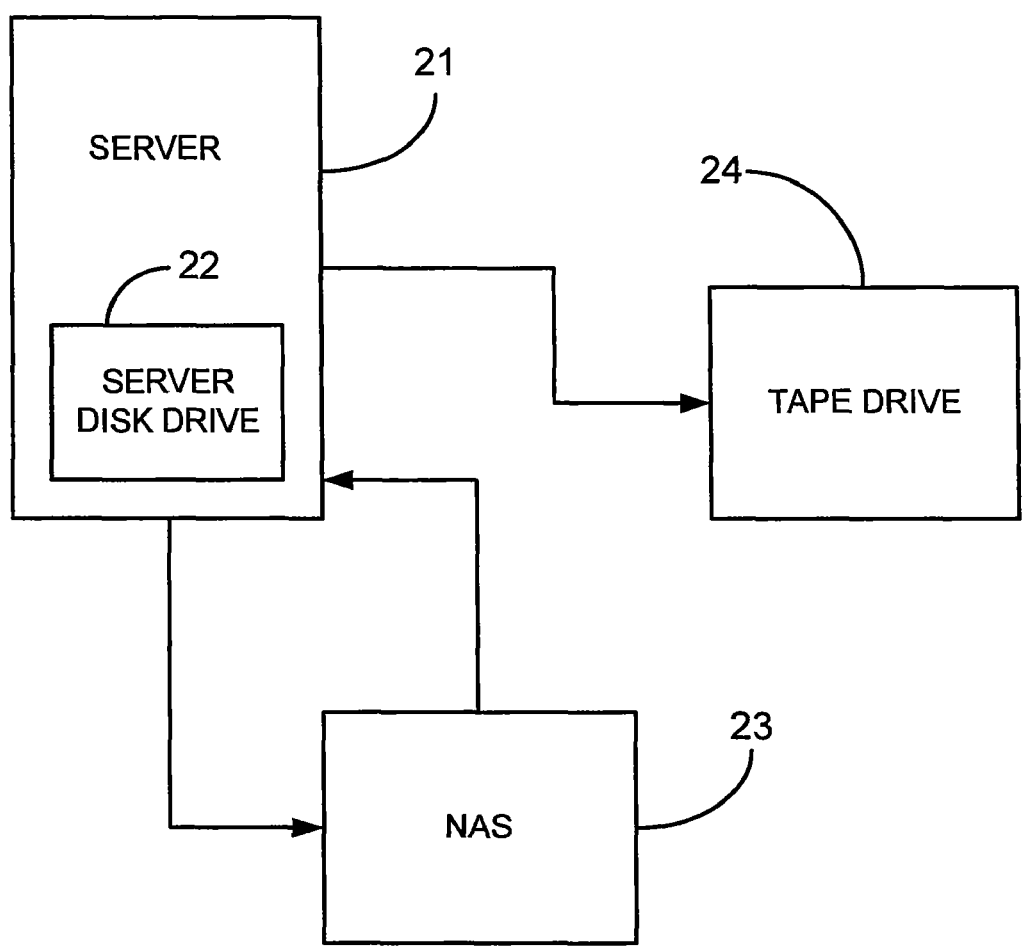
FIG. 2 is a block diagram of devices for practicing the contemporary process shown in FIG. 1.

Referring now to FIG. 2, an example of the devices used according to this contemporary process is shown in block diagram form. Information from the server 21, such as from a disk drive 22 thereof, is backed up to a disk based storage system, such as NAS 23. The information being backed up could originally have resided anywhere on the network, including on the same or a different NAS or on a SAN.

According to contemporary practice, when it is desired to transfer the information to tape, the information must first be sent back to the server 21 or another computer, where it is formatted for storage on tape. After formatting, the information is then sent to the tape drive 24.

Thus, according to contemporary practice, the information must undergo a processing step that undesirably consumes network resources, such as CPU time and communications bandwidth.

Figure 3:
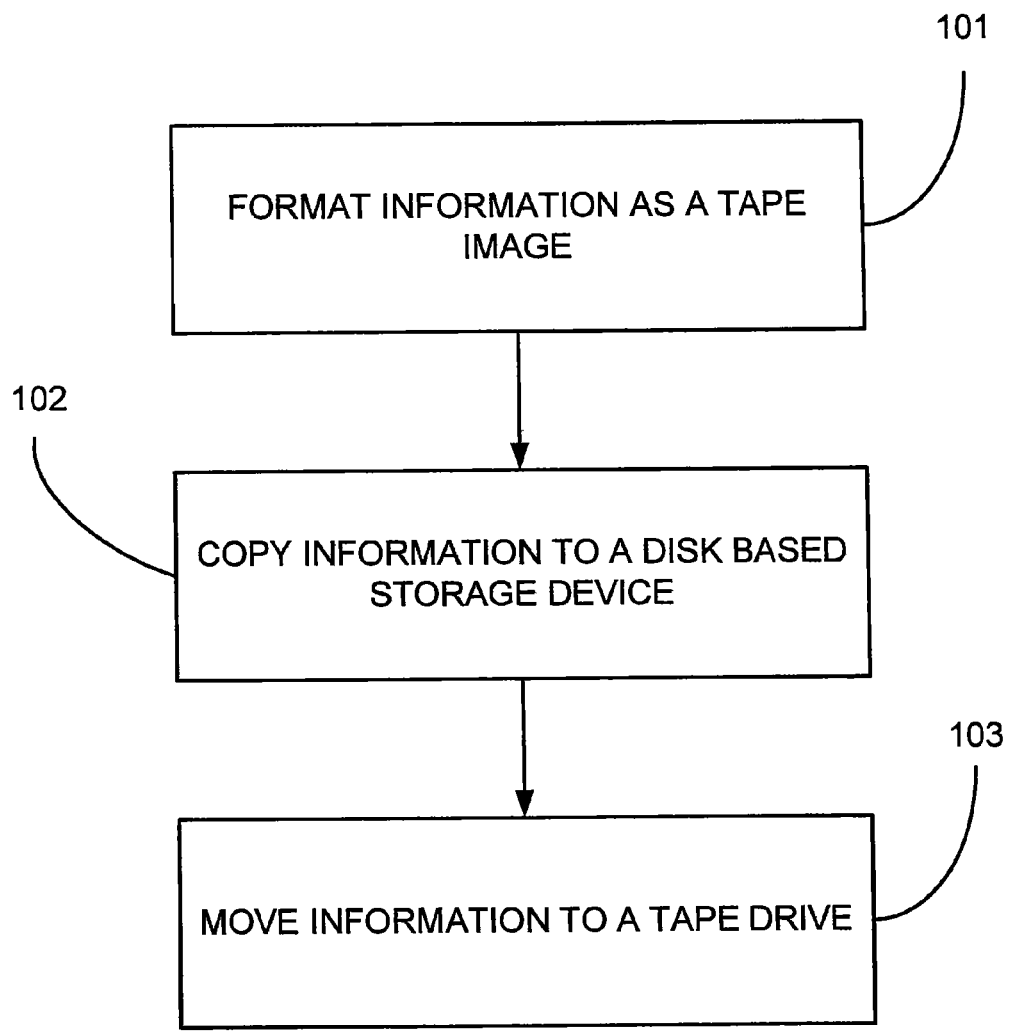
FIG. 3 is a flow chart showing the process for backing up information to a disk based storage device and subsequently transferring the information to a tape drive according to the present invention, wherein the information is formatted for the tape drive before it is stored on the disked based storage device and therefore does not need to be later formatted by a server.

Referring now to FIG. 3, this undesirable consumption of network resources is substantially mitigated by pre-processing the information to be stored on the disk based storage device in a manner that eliminates the need for further processing by a computer prior to storage of the information on tape.

More particularly, the information being backed up is formatted for storage on tape by the server or another computer prior to storing the information on a disk based storage system, as shown in block 101. Then the information is copied to the disk based storage device as shown in block 102. When desired, the information is moved to a tape drive, as shown in block 103.

The information is first backed up to a disk based storage system, such as a NAS device or SAN, because the time required to perform a disk-to-disk data transfer is very short. The speed with which this data transfer is performed minimizes undesirable disruptions to the server being backed up, for example.

However, as discussed above, it is generally desirable that the backed up information ultimately be copied to tape, so that it can easily and inexpensively be moved to a remote location for safekeeping. According to the resent invention, the undesirable used of further network resources to effect this transfer of the information to tape is substantially mitigated.

One additional advantage of formatting the information for storage on tape is that it facilitates backing up by job onto a disk based system. This is a standard and desirable way that backups are typically performed to tape. By facilitating backing up by job to disk, such standardization is desirably maintained. Thus, according to the present invention, a NAS device or SAN can be used much as if it were a tape based storage system.

Figure 4:
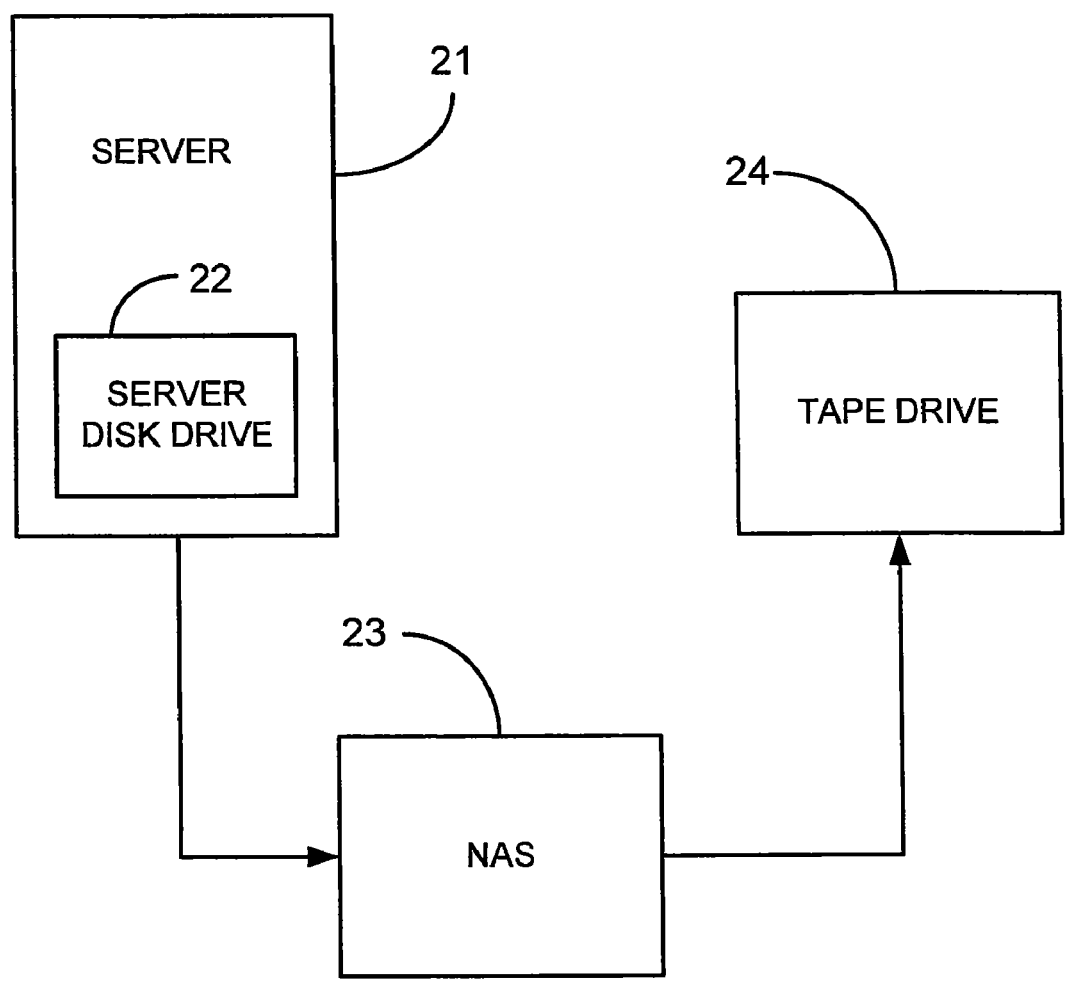
FIG. 4 is a block diagram of devices for practicing the process of the present invention shown in FIG. 3.

Referring now to FIG. 4, an example of the devices that may be used according to the process of the present invention is shown in block diagram form. According to the present invention, the information is not moved through a server in order to facilitate its storage on tape, since the information is already stored on the NAS 23 in a format that facilitates storage directly on the tape drive 24 from the NAS 23.

Of course, the NAS 23 may alternatively be a SAN device or any other type of non-tape storage device. The information is stored on this device in a tape format, such as a tape image.

Thus, according to one aspect, the present invention comprises a method for facilitating the performance of data backups, wherein the method comprises storing information on a non-tape storage device in a format that facilitates a subsequent transfer of the information to a tape storage device without substantial further processing by a computer.

According to one aspect, the present invention comprises a method for storing information, wherein the method comprises storing the information in a tape format on a non-tape storage device. The information can be stored as a tape image. For example, the information can be stored according to at least one of ANSI/ISO/ECMA DDS, DDS-DC and DDS-2.

The information can be first stored on a disk based storage device, such as a network attached storage (NAS) device or a storage area network (SAN). The information can subsequently be transferred from the non-tape storage device to a tape storage device. According to the present invention, this transfer can be accomplished without moving the information through a computer.

According to one aspect, the present invention comprises formatting the information as a tape image, communicating the information to a disk based storage system, and communicating the information to a tape drive.

According to one aspect, the present invention comprises a method for storing information on tape, wherein the method comprises forming a tape image on a non-tape storage medium and subsequently transferring the tape image to tape.

According to one aspect, the present invention comprises a device for facilitating the storage of information, wherein the device is configured to effect the storage of the information in a tape format on a non-tape storage device.

According to one aspect, the present invention comprises a system for storing information, wherein the system comprises a computer configured to store the information in a tape format on a non-tape storage device.

The computer can be configured to store the information as a tape image. The computer can be configure to store the information according to at least one of ANSI/ISO/ECMA DDS, DDS-DC and DDS-2.

The non-tape storage device can comprise a disk based storage device such as a network attached storage (NAS) device or a storage area network (SAN). However, those skilled in the art will appreciate that various other non-tape storage devices, such as solid state storage devices, optical storage devices, and the like may also be used.

A tape storage device can be in communication with the non-tape storage device. According to the present invention, the non-tape storage device and the tape storage device can be configured to transfer the information from the non-tape storage device to the tape storage device without moving the information through a computer.

According to one aspect, the present invention comprises a data structure comprising information formatted for storage on a tape storage device, wherein the information is stored on a non-tape storage device. The information can at least partially define a tape image.

According to one aspect, the present invention comprises a computer readable medium having stored thereon an instruction set for storing information, the instruction set comprising instructions for storing the information in a tape format on a non-tape storage device.

According to one aspect, the present invention comprises a method and system for backing up data to a disk based storage system, such as a NAS device or a SAN, and subsequently to a tape drive, wherein undesirable use of system resources is advantageously mitigated.

Network resources that are used less according to the present invention include server capacity and network bandwidth. Mitigating the amount of network resources required for the transfer of information from the disk based storage device to the tape storage device desirably frees these resources so that they are available to perform the normal, e.g., non-backup, duties of the network.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A method for storing backed up information, the method comprising:
    storing the backed up information as a tape image on a disk based storage device;
    transferring the backed up information directly from the disk based storage device to a tape storage device without substantial further processing of the tape image by a computer; and
    wherein the disk based storage device and the tape storage device are physically separate devices.

2. The method as recited in claim 1, wherein the backed up information is stored according to at least one of ANSI/ISO/ECMA DDS, DDS-DC and DDS-2.

3. The method as recited in claim 1, wherein the disk based storage device comprises a network attached storage (NAS) device.

4. The method as recited in claim 1, wherein the disk based storage device comprises a storage area network (SAN).

5. A method for storing backed up information, the method comprising:
    formatting the backed up information as a tape image;
    communicating the backed up information to a disk based storage system;
    communicating the backed up information from the disk based storage system directly to a tape drive without substantial further processing of the tape image by a computer; and
    wherein the disk based storage system and the tape drive are physically separate devices.

6. A system for storing backed up information, the system comprising:
    a disk based storage device, a tape storage device, and a computer configured to store backed up information as a tape image on the disk based storage device;
    wherein the disk based storage device and the tape storage device are configured to transfer the backed up information directly from the disk based storage device to the tape storage device without substantial further processing of the tape image by the computer; and
    wherein the disk based storage device and the tape storage device are physically separate devices.

7. The system as recited in claim 6, wherein the computer is configure to store the backed up information according to at least one of ANSI/ISO/ECMA DDS, DDS-DC and DDS-2.

8. The system as recited in claim 6, wherein the disk based storage device comprises a network attached storage (NAS) device.

9. The system as recited in claim 6, wherein the disk based storage device comprises a storage area network (SAN).

10. The system as recited in claim 6, wherein the tape storage device is in communication with the disk based storage device.

11. A system for managing information of a user, the system comprising:
    a tape storage device;
    a disk based storage device in communication with the tape storage device, wherein the disk based storage device and the tape storage device are physically separate devices;
    one or more processors in communication with the disk based storage device;
    a computer readable memory in communication with the one or more processors, the computer readable memory for storing computer instructions, which, when executed by the one or more processors, cause the one or more processors to store the backed up information as a tape image on a disk based storage device, and transfer the backed up information directly from the disk based storage device to a tape storage device without substantial further processing of the tape image by a computer.

* * * * *